United States Patent
Roth et al.

(10) Patent No.: US 7,028,165 B2
(45) Date of Patent: Apr. 11, 2006

(54) PROCESSOR STALLING

(75) Inventors: Charles P. Roth, Austin, TX (US); Ravi P. Singh, Austin, TX (US); Gregory A. Overkamp, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 534 days.

(21) Appl. No.: 09/731,198

(22) Filed: Dec. 6, 2000

(65) Prior Publication Data

US 2002/0069348 A1 Jun. 6, 2002

(51) Int. Cl.
G06F 15/00 (2006.01)

(52) U.S. Cl. .................... 712/216; 712/218

(58) Field of Classification Search ........... 712/216, 712/218
See application file for complete search history.

(56) References Cited

U.S. PATENT DOCUMENTS

| | | | | |
|---|---|---|---|---|
| 5,073,855 A | * | 12/1991 | Staplin et al. | 712/217 |
| 5,179,693 A | * | 1/1993 | Kitamura et al. | 713/601 |
| 5,404,485 A | * | 4/1995 | Ban | 711/202 |
| 5,471,591 A | * | 11/1995 | Edmondson et al. | 712/217 |
| 5,488,730 A | * | 1/1996 | Brown et al. | 712/41 |
| 5,627,984 A | * | 5/1997 | Gupta et al. | 712/200 |
| 6,038,658 A | * | 3/2000 | Chow | 712/219 |
| 6,401,195 B1 | * | 6/2002 | Arora et al. | 712/218 |
| 6,587,940 B1 | * | 7/2003 | Soltis et al. | 712/216 |

FOREIGN PATENT DOCUMENTS

| | | |
|---|---|---|
| EP | 0 638 858 | 2/1995 |
| JP | 61-288230 | 12/1986 |
| JP | 11-149373 | 6/1999 |
| JP | 2000-105698 | 4/2000 |

OTHER PUBLICATIONS

Patterson and Hennessy, Computer Organization and Design, 2nd Ed., 1998, p. 468 and B-22 to B-23.*
Hennessy, John L. and Patterson, David A. "Computer Architecture A Quantitative Approach", Second Edition. San Francisco, CA: Morgan Kaufmann Publishers, Inc., ©1996. pp. 139-178.*
www.dictionary.com Search Term: stall.*

* cited by examiner

Primary Examiner—Eddie Chan
Assistant Examiner—Aimee J. Li
(74) Attorney, Agent, or Firm—Fish & Richardson P.C.

(57) ABSTRACT

A programmable processor that includes a pipeline with a number of stages. A stall controller is associated with the pipeline, and detects a hazard condition in at least one of those stages. The stall controller produces a set of signals that can control the stages individually, to stall stages of the pipeline in order to avoid a hazard. In an embodiment, a bubble is formed in the pipeline which allows one instruction to complete prior to allowing the pipeline to continue.

30 Claims, 8 Drawing Sheets

PROCESSOR STALLING

BACKGROUND

This invention relates to stalling a programmable processor.

"Pipelining" is a technique used in conventional programmable processors, such as digital signal processors, in which instructions are overlapped in execution in order to increase overall processing speed. A pipelined processor typically processes instructions in a number of stages. An instruction moves from one stage to the next according to a system clock, which typically has a clock rate determined by the slowest stage in the pipeline.

While processing instructions, conditions, called "hazards," sometimes prevent the next instruction in the instruction stream from executing. For example, a data hazard arises when an instruction depends on the results of a previous instruction that has not finished from the pipeline. Hazards, therefore, cause the pipeline to "stall" and reduce the pipeline's performance.

One common solution is a hardware addition called a pipeline interlock, which detects a hazard and stalls a pipeline until the hazard has cleared. Typically, the pipeline interlock stalls the pipeline by inserting a special instruction, commonly called a "NOP," that requires no operation from the pipeline but consumes a slot in the instruction stream.

DESCRIPTION

Figure 1:
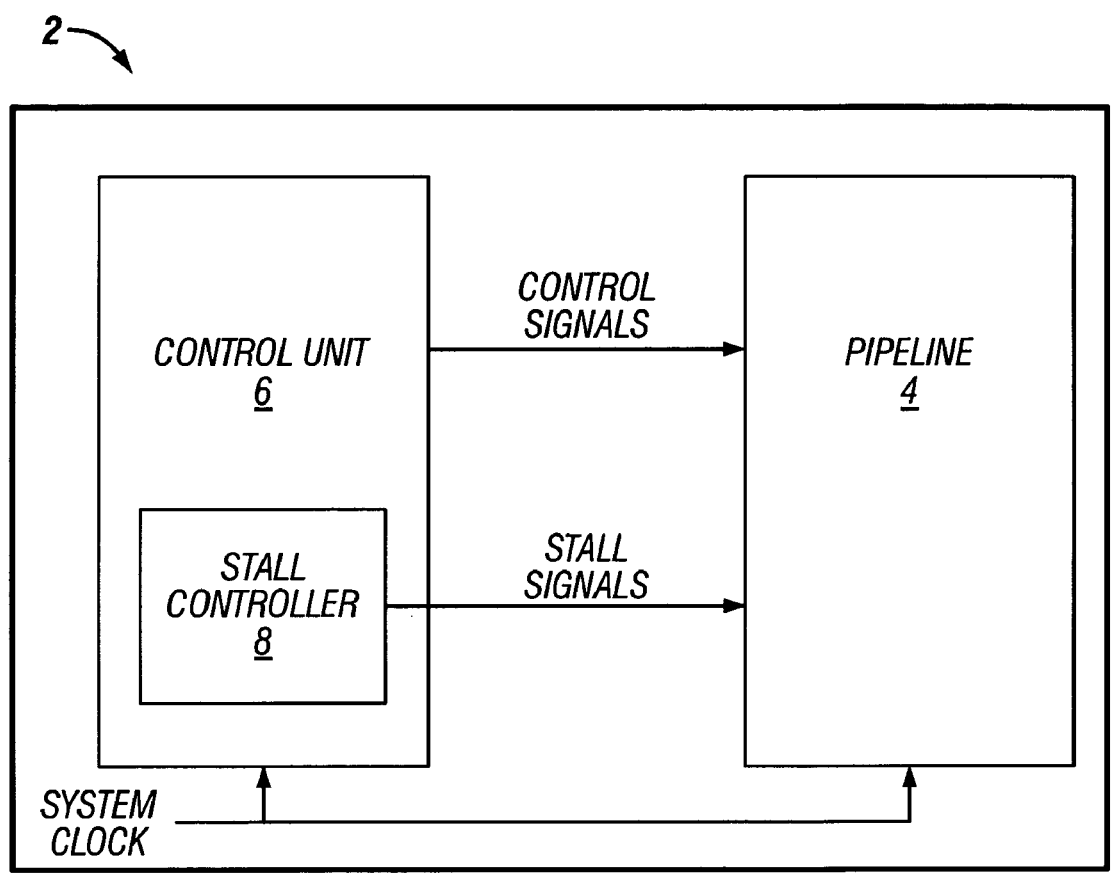
FIG. 1 is a block diagram illustrating an example of a pipelined programmable processor according to an embodiment of the invention.

FIG. 1 is a block diagram illustrating a programmable processor 2 having an execution pipeline 4 and a control unit 6. Control unit 6 controls the flow of instructions and data through pipeline 4. For example, during the processing of an instruction, control unit 6 may direct the various components of the pipeline to decode the instruction and correctly perform the corresponding operation including, for example, writing the results back to memory.

Instructions may be loaded into a first stage of pipeline 4 and processed through the subsequent stages. Each stage processes concurrently with the other stages. Data passes between the stages in pipeline 4 in accordance with a system clock. The results of the instructions emerge at the end of the pipeline 4 in rapid succession.

Stall controller 8 may detect a hazard condition and asserts one or more stall signals to stall pipeline 4. As described below, stall controller 8 synchronously generates the stall signals according to system clock 9.

Figure 2:
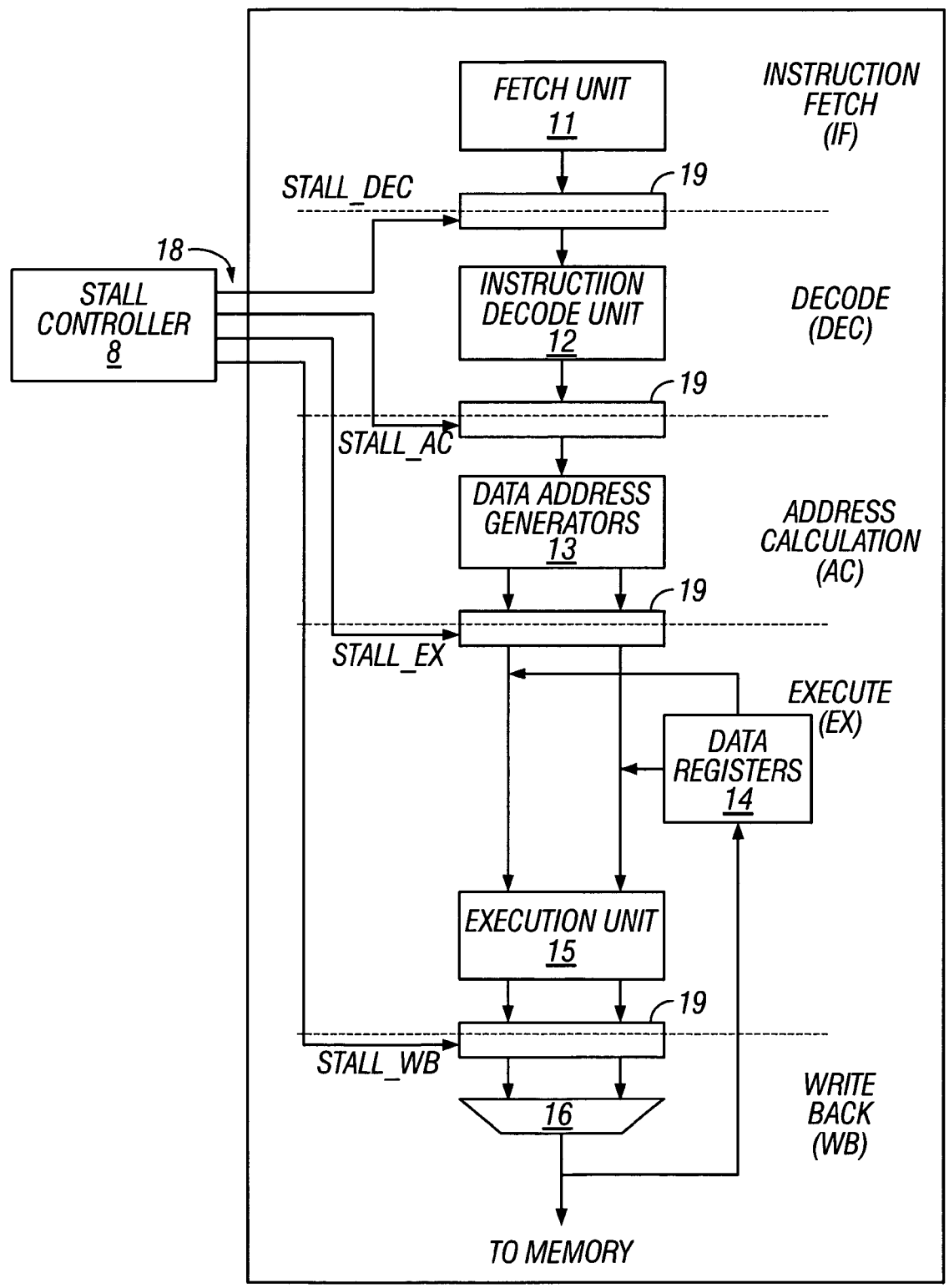
FIG. 2 is a block diagram illustrating an example pipeline for the programmable processor.

FIG. 2 illustrates an example pipeline 4 according to the invention. Pipeline 4, for example, may have five stages: instruction fetch (IF), instruction decode (DEC), address calculation (AC), execute (EX) and write back (WB). Instructions may be fetched from a memory device such as, for example, main memory or an instruction cache during the first stage (IF) by fetch unit 11 and decoded during the second stage (DEC) by instruction decode unit 12. At the next clock cycle, the results are passed to the third stage (AC), where data address generators 13 calculate any memory addresses to perform the operation.

During the execution stage (EX), execution unit 15, performs a specified operation such as, for example, adding or multiplying two numbers. Execution unit 15 may contain specialized hardware for performing the operations including, for example, one or more arithmetic logic units (ALU's), floating-point units (FPU) and barrel shifters. A variety of data may be applied to execution unit 15 such as the addresses generated by data address generators 13, data retrieved from memory 17 or data retrieved from data registers 14. During the final stage (WB), the results are written back to data memory or to data registers 14.

The stages of pipeline 4 include stage storage circuits, such as stage registers 19, for storing the results of the current stage. Stage registers 19 typically latch the results according to the system clock. Stage registers 19 receive the stall signals 18, which control whether or not stage registers 19 latch the results from the previous stage. In this manner, stall controller 8 may synchronously stall one or more stages of pipeline 4. Notably, controller 8 effectively freezes pipeline 4 without inserting non-operational instructions ("NOPS") into the instruction stream.

In addition, as discussed in more detail below, stall controller 8 may detect a hazard condition one or more cycles prior to the condition arising such that stall signals 18 may be generated by outputs from storage circuits, such as flip-flops, which are capable of supporting high fan-out requirements. Furthermore, pipeline 4 need not contain additional hardware to temporarily store the results of an operation until the stall condition no longer exists.

Figure 3:
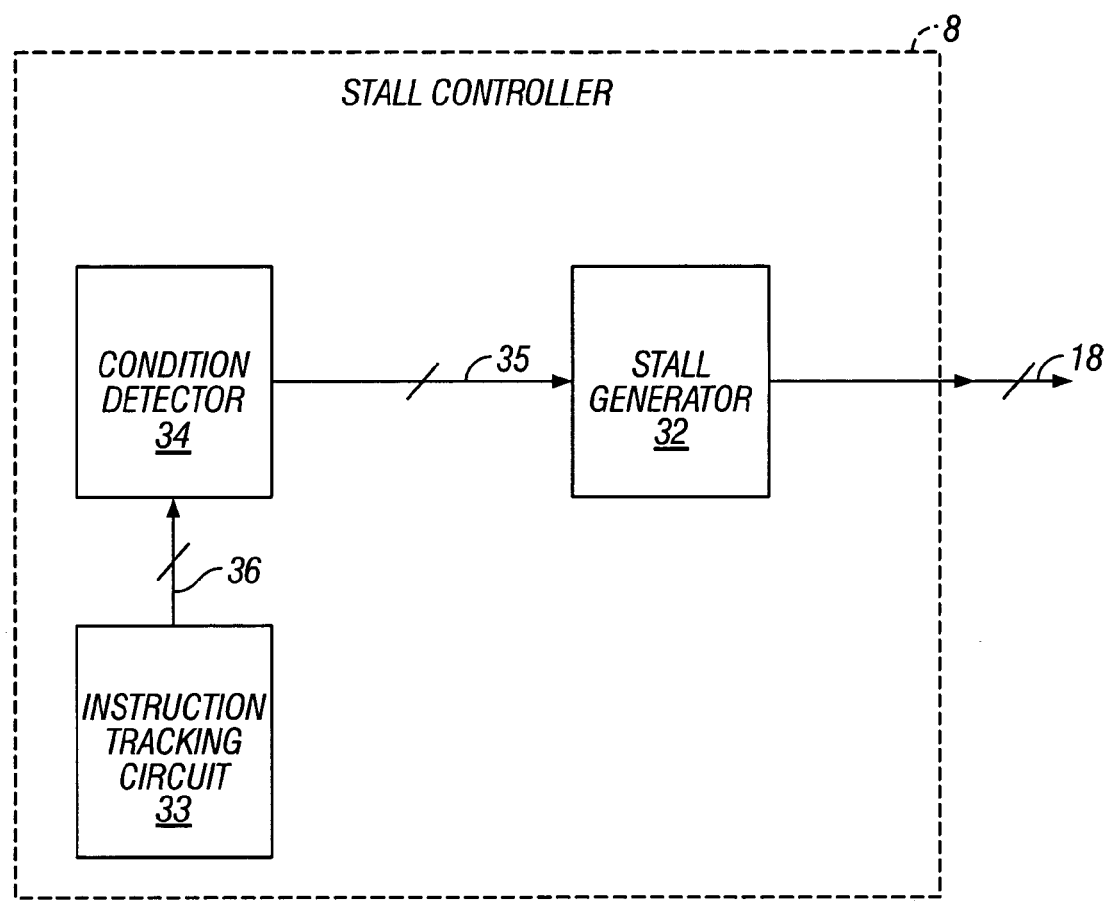
FIG. 3 is a block diagram for one embodiment of a stall controller.

FIG. 3 is a block diagram illustrating one embodiment of stall controller 8. Stall controller 8 may include stall generator 32, condition detector 34, and instruction tracking circuit 33. As described in detail below, instruction tracking circuit 33 outputs one or more stage indication signals 36 that indicate the presence of one or more types of instructions in the various stages of pipeline 4. For example, instruction tracking circuit 33 may assert a particular stage indication signals 36 when a branch instruction is within the address calculation (AC) stage of pipeline 4.

Generally, instruction tracking circuit 33 detects the presence of various types of instructions that, when present in certain stages, create a hazard condition requiring pipeline 4 to stall for one or more cycles. Instruction tracking circuit 33 asserts stage indication signals 36 as potentially hazard causing instructions flow through the various stages of pipeline 4. Condition detector 34 receives stage indication signals 36 and determines whether or not the presence of the instructions in the various stage of pipeline 4 cause a hazard and, if so, the number of cycles that pipeline 4 needs to be stalled. Condition detector 34 may assert hazard condition signals 35 for one or more cycles when a hazard is detected in pipeline 4. Stall generator 32 receives hazard condition signals 35 and, based upon the detected hazards, may assert stall signals 18 to stall one or more stages of pipeline 4 for one or more cycles.

Figure 4:
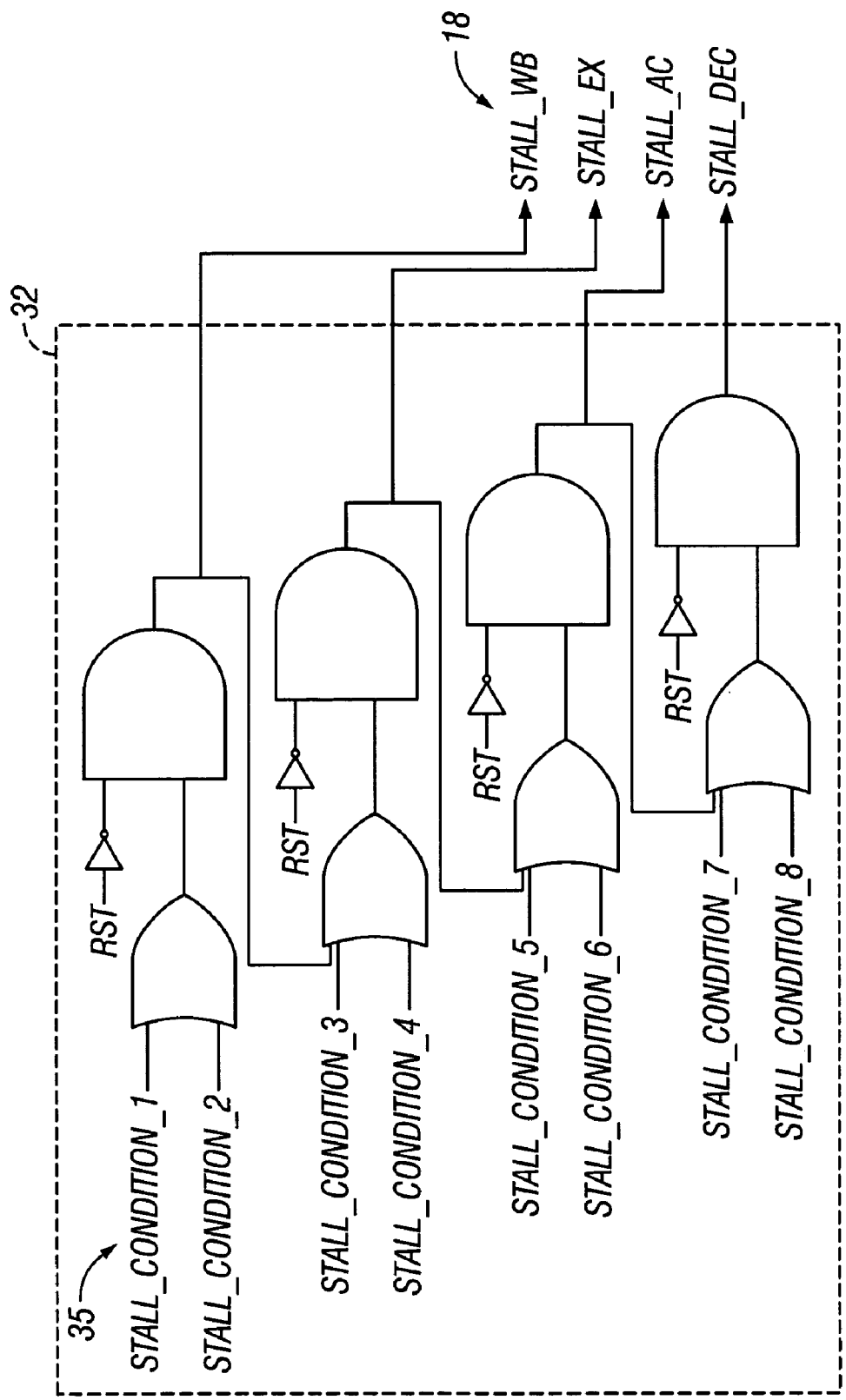
FIG. 4 is a schematic diagram illustrating an example embodiment of a stall generator.

FIG. 4 is a schematic diagram illustrating an example embodiment of stall generator 32. Stall generator 32 may receive a number of hazard condition signals 35, such as stall_condition_1 through stall_condition_8, which may be asserted when a respective stall condition has been detected by condition detector 34. The input signals are for exemplary purposes only; for example, stall generator 32 may receive any number of different stall conditions for the various stages of pipeline 4.

In response to hazard condition signals 35, stall generator 32 may generate stall signals 18 to stall pipeline 4. Stall generator 32 may produce a plurality of stall signals 18, which correspond to the stages of pipeline 4. For example, when either stall_condition_1 or stall_condition_2 is asserted, and processor 2 is not in reset, stall generator 32 may assert the stall_wb output signal, resulting in a stall of the WB stage of pipeline 4. Notably, the stall_wb output signal is used to generate stall output signals for earlier stages of pipeline 4, such as the stall_ex output signal. More specifically, stall generator 32 asserts the stall_ex output signal when stall_condition_3, stall_condition_4 or stall_wb is asserted and processor 2 is not in reset. In this manner, a stall in the WB stage forces a stall in the EX stage. Stall generator 32 similarly generates the stall_ac and stall_dec signals based on independent hazard conditions as well as stalls in lower stages of pipeline 4.

Figure 5:
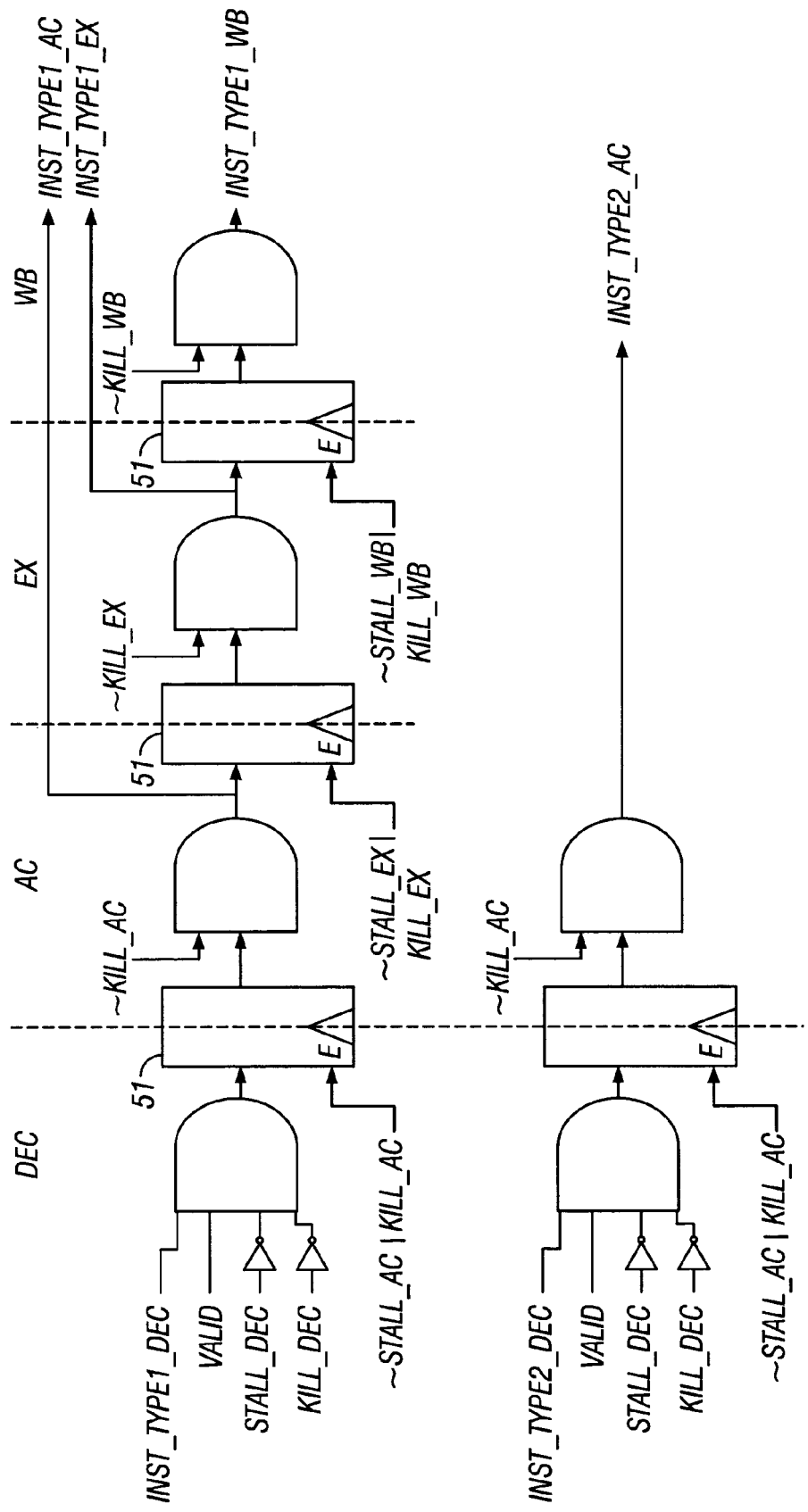
FIG. 5 is a schematic diagram for one embodiment of an in instruction tracking circuit.

FIG. 5 illustrates an example embodiment of instruction tracking circuit 33 that provides stage indication signals 36. In the illustrated embodiment, two instruction types may be monitored, although the invention is not limited as such. Instruction tracking circuit 33 provides three output signals indicating the presence of a first instruction type: INST_TYPE1_AC, INST_TYPE1_EX and INST_TYPE1_WB. These signals indicate the presence of a first instruction type within the AC, EX and WB stage, respectively.

In addition, instruction tracking circuit 33 provides a single output indicating the presence of a second instruction type: INST_TYPE2_AC. This signal signal indicates the presence of a second type of instruction within the AC state of pipeline 4.

Instruction tracking circuit 33 receives a number of inputs including INST_TYPE1_DEC and INST_TYPE2_DEC. These instructions are provided by decode logic within control unit 6 and are asserted when a first instruction type or a second instruction type is present and decoded within the decode stage, respectively. Both of these signals are qualified to ensure that the instruction in the decode stage is valid and has not been "killed", for example by the instruction stream changing due to a branch condition, and that the instruction has not been stalled in the decode stage. The presence of a first instruction type causes an asserted signal to propagate through the series of flip-flops 51 as the instruction flows through pipeline 4. The asserted signal is further qualified at each stage.

Similarly, the presence of the second type of instruction is detected in the decode stage and propagated through a single flip-flop to provide the output INST_TYPE2_AC. The progression of the second type of instruction could be monitored through all of the stages; however, the example described below detects the presence of the second type of instruction within the AC stage.

The example circuits described below illustrate example logic for stalling the second type of instruction within the AC stage when the second type of instruction follows the first type of instruction in the instruction stream and inserting one or more "bubbles" between the second type of instruction and the first type of instruction.

Figure 6:
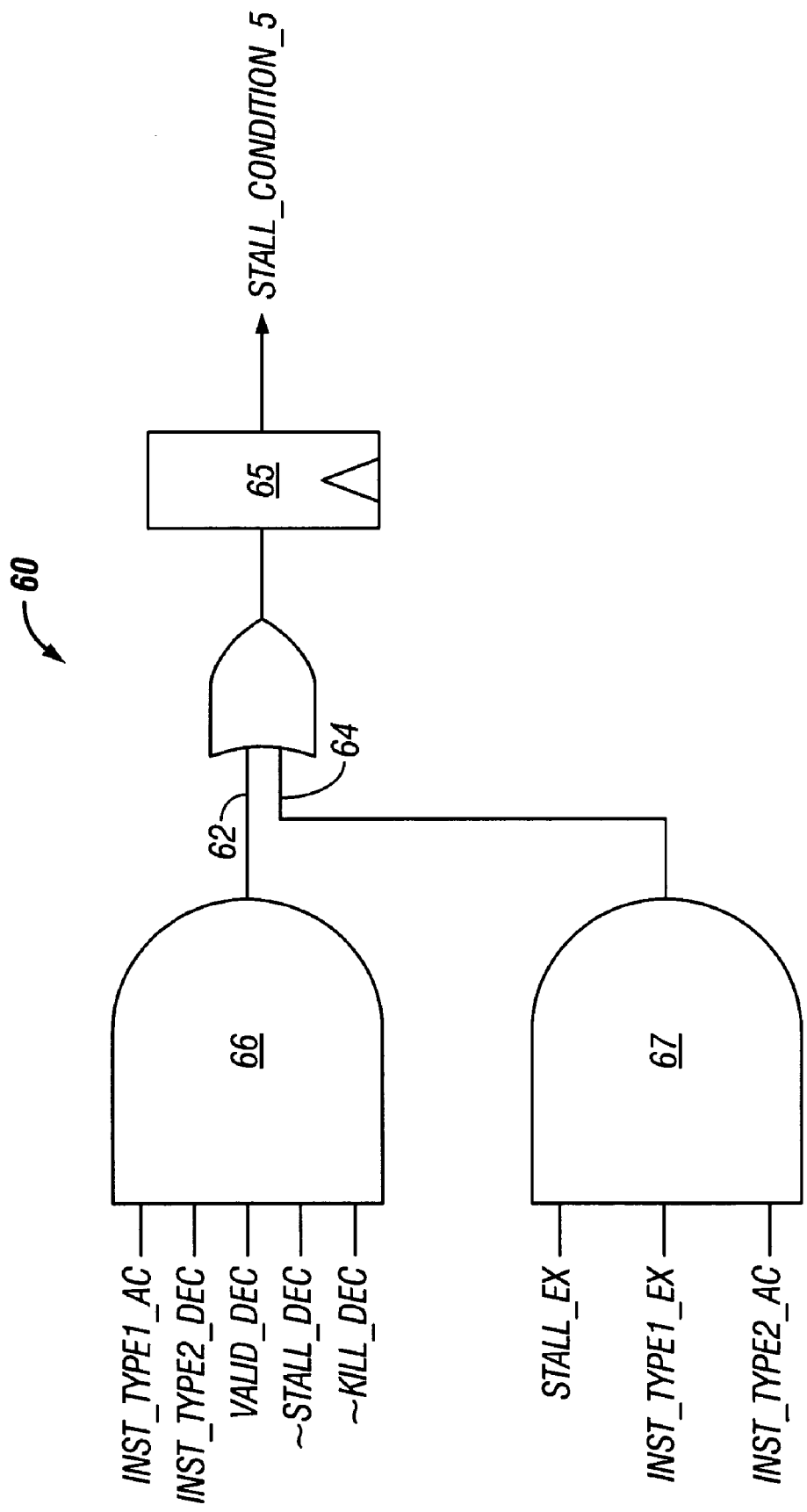
FIG. 6 is schematic diagram for one embodiment of a condition detector generator for a single-cycle stall.

FIG. 6 is a schematic diagram of example circuitry 60 within condition detector 34 for detecting a hazard and stalling pipeline 4 for a single cycle. More specifically, circuitry 60 generates a stall condition signal, such as stall_condition_5 of FIG. 4, for stalling the AC stage of pipeline 4 for a single clock cycle when the second type of instruction follows the first type of instruction in the instruction stream. Notably, condition generator 60 generates stall_condition_5 synchronously such that stall_condition_5 is provided directly from a clocked storage circuit, such as flip-flop 65.

In the illustrated embodiment, the circuitry 60 inserts a single bubble between the first instruction and the second instruction as the instructions propagate through pipeline 4. AND gate 66 asserts STALL_GENERATE_SIGNAL 62 when an instruction of type 1 is in the AC stage, an instruction of type 2 is in the decode stage and the instruction of type 2 is a valid instruction, has not been stalled and has not been killed. At the next clock cycle, as instruction 1 and instruction 2 propagate to the AC and EX stages respectively, storage circuit 65 latches STALL_GENERATE_SIGNAL 62 and outputs STALL_CONDITION_5 to stall generator 32. At the next clock cycle, assuming that a stall condition is not present in the EX stage or lower stages of pipeline 4, the assertion of STALL_CONDITION_5 causes the second instruction to stall in the AC stage while the first instruction propagates to the WB stage, thereby inserting a bubble between the two instructions. If, however, there had been a stall in the EX stage, AND gate 67 would have asserted STALL_HOLD_SIGNAL 64 while the first instruction was stalled in the EX stage and the second instruction 2 stalled in the AC stage. STALL_HOLD_SIGNAL 64 causes storage circuit 65 to maintain STALL_CONDITION_5 signal until the first instruction is no longer stalled in the EX stage, at which point a single bubble is inserted between the instructions during the following clock cycle. The stall_ex input to AND gate 67 ensures that when the EX stall is released, STALL_HOLD_SIGNAL 64 will be deasserted in time so as to not insert an extra unwanted bubble.

Figure 7:
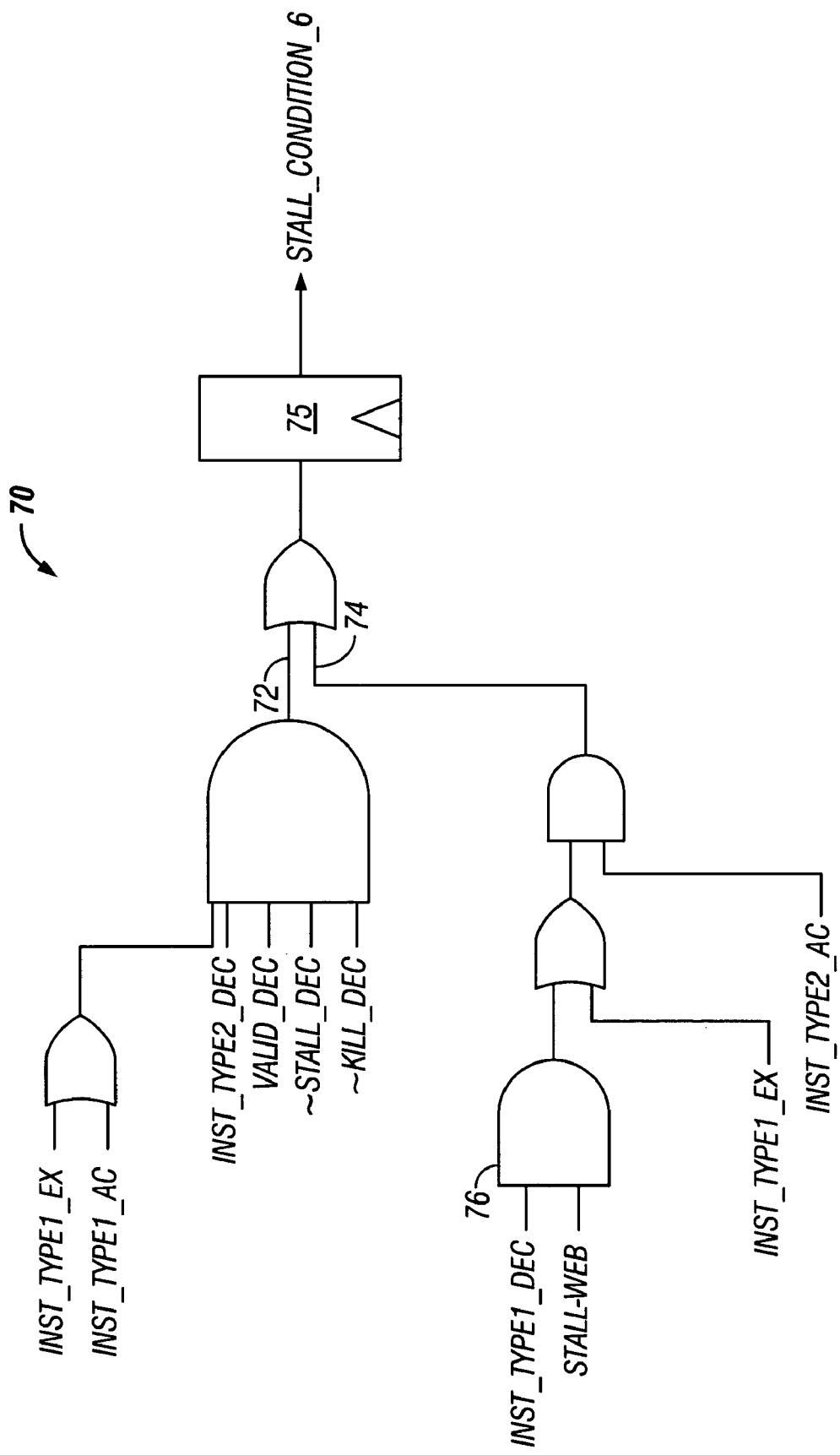
FIG. 7 is schematic diagram for one embodiment of a condition detector for a two-cycle stall.

FIG. 7 is a schematic diagram of example circuitry 70 within condition detector 34 for detecting a hazard and inserting two bubbles between a first instruction and a second instruction when the first instruction is of type 1 and the second instruction is of type 2. More specifically, circuitry 70 stalls the second instruction in the AC stage until the first instruction has completed the write back stage.

In the illustrated embodiment, STALL_GENERATE_SIGNAL 72 is asserted when a valid and qualified instruction of type 2 is present in the decode stage of pipeline 4 and instruction of type 1 is present in the EX stage or the AC stage of pipeline 4. Thus, during subsequent clock cycles, STALL_GENERATE_SIGNAL 72 causes storage circuit 75 to assert STALL_CONDITION_6 signal. Assuming that a stall condition does not exist in a lower stage of pipeline 4, two bubbles are inserted between the first instruction and the second instruction. The second instruction is allowed to propagate through pipeline 4 when the first instruction clears the WB stage.

STALL_HOLD_SIGNAL 74, however, is asserted when the second instruction type is present in the AC stage and the first instruction type is either stalled in the WB stage or present in the EX stage. STALL_HOLD_SIGNAL 74 causes storage circuit 75 to maintain STALL CONDITION 6 signal until the first instruction clears the WB stage. The stall_wb input signal to AND gate 76 ensures that when the WB stall is released, STALL_HOLD_SIGNAL 74 will be deasserted in time so as to not insert an extra unwanted bubble.

Figure 8:
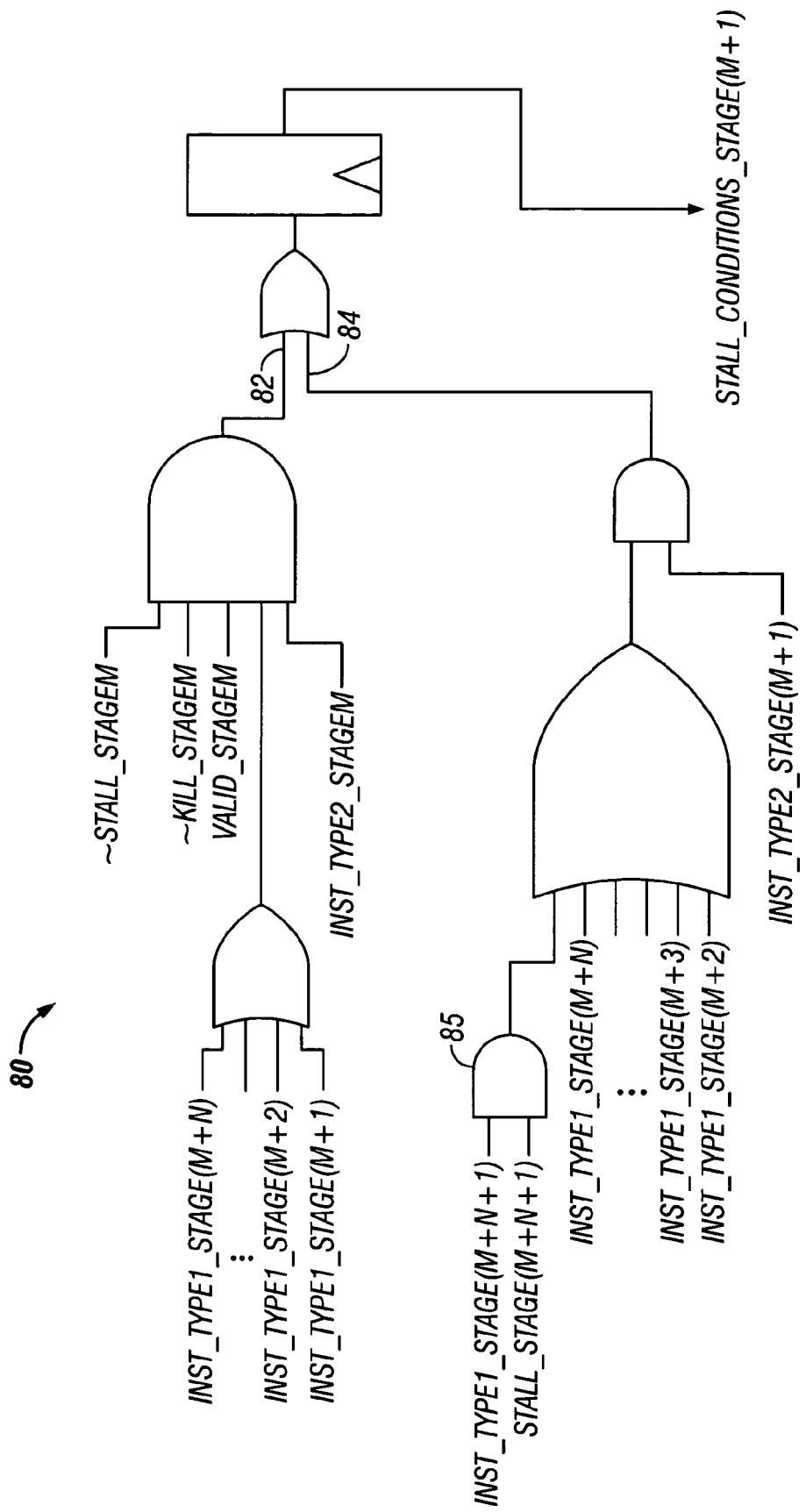
FIG. 8 is schematic diagram for one embodiment of a condition detector for an N cycle stall.

FIG. 8 is a schematic diagram of example circuitry 80 for pre-detecting a stall condition in stage M, stalling the second instruction in stage M+1, inserting N bubbles between the first instruction and the second instruction. STALL_GENERATE_SIGNAL 82 is asserted when an instruction of type 2 is within stage M and an instruction of type 1 is present in any stage between stage M+1 and stage M+N. Similarly, STALL_HOLD_SIGNAL 84 is asserted when an instruction of type 2 is present within stage M+1, i.e., the stage immediately following the stage in which the stall condition is pre-detected, and an instruction of type 1 is stalled in any stage between stage M+2 and stage M+N+1. The stall_stage (M+N+1) input to AND gate 85 ensures that when the stall of stage M+N+1 is released, STALL_HOLD_SIGNAL 84 will be deasserted in time so as to not insert an extra unwanted bubble.

Various embodiments of the invention have been described. For example, a single machine instruction has been described that conditionally moves data between a pointer register and a data register. The processor can be implemented in a variety of systems including general purpose computing systems, digital processing systems, laptop computers, personal digital assistants (PDA's) and cellular phones. In such a system, the processor may be coupled to a memory device, such as a Flash memory device or a static random access memory (SRAM), that may store an operating system or other software applications. These and other embodiments are within the scope of the following claims.

What is claimed is:

1. A method comprising:
during a first clock cycle, pre-detecting a hazard condition within a pipelined processor;
during a second clock cycle, generating a set of stall signals that include individual signals that are respectively specific to stages of the pipeline;
determining whether a current stall condition already exists in the pipeline;
delaying the stall signal based on the determination; and
stalling one or more stages of the pipeline according to the set of stall signals, wherein when the hazard condition is detected in stage M of the pipeline, where M is a positive integer, generating the set of stall signals comprises generating the set of stall signals to stall stage 1 through stage M+1 wherein stage M+1 is downstream of stage M.

2. The method of claim 1 further comprising:
during the first clock cycle, generating a stall generate signal to stall the pipeline for one clock cycle; and
during the first clock cycle, generating a stall hold signal based on the hazard detected to stall the pipeline for one or more additional cycles.

3. The method of claim 1, wherein said stalling comprises preventing a stage from latching results from a previous stage.

4. A method as in claim 1, wherein said generating comprises, based on said pre-detecting, determining a set of signals to be produced, wherein said set of signals which may have a single individual signal for each stage of the pipeline, or signals for fewer stages then each stage of the pipeline.

5. An apparatus comprising:
a pipeline having a number of stages; and
a stall controller comprising:
    a condition detection circuit adapted to pre-detect a hazard condition during a first clock cycle; and
    a stall generator adapted to generate a set of stall signals that include individual signals that are respectively specific to stages of the pipeline upstream and downstream of the hazard condition, during a second clock cycle based on the detected hazard, to stall one or more downstream stages of the pipeline by preventing a stage from storing information from a previous stage and without inserting nonoperational instructions into the instruction stream.

6. The apparatus of claim 5, wherein the stall controller comprises an instruction tracking circuit having one or more stage indication output signals indicating a presence of one or more types of instructions in the stages of the pipeline, and further wherein the condition detection circuit pre-detects the hazard based on the stage indication output signals.

7. The apparatus of claim 5, wherein the stages comprise pipeline registers having write enable inputs to receive the stall signals.

8. The apparatus of claim 5, wherein the stall controller receives a clock signal and synchronously generates the stall signals according to the clock signal.

9. The apparatus of claim 8, wherein the stall controller comprises a storage circuit adapted to output the stall signal at least one cycle of the clock signal after detecting the hazard condition.

10. The apparatus of claim 5, wherein the stall generator is adapted to output stall signals for stages 1 through M+1 of the pipeline when the condition detection unit detects the hazard condition in stage M, where M is a positive integer.

11. The apparatus of claim 5, wherein the condition detection unit includes a stall generate output signal to stall the pipeline for one clock cycle and a stall hold signal to stall the pipeline for one or more additional cycles.

12. An apparatus as in claim 5, wherein said stall generator determines said set of signals to be produced based on said detecting by said condition detection circuit, and where said set of signals may include a single individual signal for each stage of the pipeline, or signals for fewer stages then each stage of the pipeline.

13. An apparatus as in claim 5, wherein said stall generator creates signals that prevent a pipeline from saving values of a previous pipeline and without inserting nonoperational instructions into an instruction stream.

14. A system comprising:
a Flash memory device; and
a processor coupled to the Flash memory device, wherein the processor includes a pipeline having a plurality of stages and a stall controller comprising:
    a condition detection circuit adapted to pre-detect a hazard condition during a first clock cycle; and
    a stall generator adapted to generate a set of stall signals that include individual signals that are respectively specific to stages of the pipeline upstream and downstream of the hazard condition, during a second clock cycle based on the detected hazard to stall one or more downstream stages of the pipeline including stalling one stage in which the hazard condition was detected, and all stages downstream of said one stage.

15. The system of claim 14, wherein the stall controller comprises an instruction tracking circuit having one or more stage indication output signals indicating a presence of one or more types of instructions in the stages of the pipeline, and further wherein the condition detection circuit pre-detects the hazard based on the stage indication output signals.

16. The system of claim 14, wherein the stages comprise pipeline registers having write enable inputs to receive the stall signals.

17. The system of claim 14, wherein the stall controller receives a clock signal and synchronously generates the stall signals according to the clock signal.

18. The system of claim 14, wherein the stall controller comprises a storage circuit adapted to output the stall signal at least one cycle of the clock signal after detecting the hazard condition.

19. The system of claim 14, wherein the stall generator is adapted to output stall signals for stages 1 through M+1 of the pipeline when the condition detection unit detects the hazard condition in stage M where M is a positive integer.

20. The system of claim 14, wherein the condition detection unit includes a stall generate signal to stall the pipeline for one clock cycle and a stall hold signal to stall the pipeline for one or more additional cycles.

21. A system as in claim 14, wherein said stall generator determines said set of signals to be produced based on said detecting by said condition detection circuit, and where said set of signals may include a single individual signal for each stage of the pipeline, or signals for fewer stages then each stage of the pipeline.

22. An apparatus for inserting N, where N is a positive integer, stall cycles between a first instruction and a second instruction in a pipelined comprising a condition detection circuit adapted to assert:
a stall generate signal when the second instruction is within stage M and the first instruction is present in any stage between stage M+1 and stage M+N, where M is a positive integer; and
a stall hold signal processor in response to a pre-detection of a hazard condition when the second instruction is present within stage M+1 and the first instruction is stalled between stages M+2 and M+N+1 and stage M+1 is downstream of stags M.

23. The apparatus of claim 22, wherein the stall generator further comprises a clocked storage circuit to output a stall condition signal based on the stall generate signal and the stall hold signal.

24. The apparatus of claim 23 further comprising a stall generator adapted to generate a set of stall signals based on the stall condition signal.

25. The apparatus of claim 22 further comprising an instruction tracking circuit having one or more stage indication output signals indicating a presence of one or more types of instructions in the stages of the pipeline, and further wherein the condition detection circuit asserts the stall generation signal and the stall hold signal based on the stage indication output signals.

26. A method for inserting N stall cycles between a first instruction and a second instruction in a pipelined processor having a plurality of stages comprising:
asserting a stall generate signal in response to a pre-detection of a hazard condition when the second instruction is within stage M and the first instruction is present in any stage between stage M+1 and stage M+N, where M and N are positive integers;
asserting a stall hold signal when the second instruction is present within stage M+1 and the first instruction is stalled between stages M+2 and M+N+1 and stage M+1 is downstream of stage M; and
stalling one or more stages of the pipeline in response to the stall generate signal and the stall hold signal.

27. The method of claim 26, further comprising:
clocking the stall generate signal and the stall hold signal into a storage circuit on a first clock cycle; and
outputting a stall condition signal from the storage circuit on a second clock cycle.

28. The method of claim 27 further comprising generating a set of stall signals based on the stall condition signal.

29. A method comprising:
during a first clock cycle, pre-detecting a hazard condition within a pipelined processor;
during a second clock cycle, generating a set of stall signals that include individual signals that are respectively specific to stages of the pipeline; and
stalling one or more stages of the pipeline according to the set of stall signals, wherein when the hazard condition is detected in stage M of the pipeline, where M is a positive integer, generating the set of stall signals comprises generating the set of stall signals to stall stage 1 through stage M+1 wherein stage M+1 is downstream of stage M; and
storing the stall signal in a storage circuit when the detected hazard condition requires more than a single cycle stall of the pipeline.

30. A method comprising:
during a first clock cycle, pre-detecting a hazard condition within a pipelined processor;
during a second clock cycle, generating a set of stall signals that include individual signals that are respectively specific to stages of the pipeline; and
stalling one or more stages of the pipeline according to the set of stall signals without inserting nonoperational instructions into an instruction stream, wherein when the hazard condition is detected in stage M of the pipeline, where M is a positive integer, generating the set of stall signals comprises generating the set of stall signals to stall stage 1 through stage M+1 wherein stage M+1 is downstream of stage M.

* * * * *